US010790502B2

(12) United States Patent
Marusczyk et al.

(10) Patent No.: US 10,790,502 B2
(45) Date of Patent: Sep. 29, 2020

(54) ACTIVE MATERIAL FOR A POSITIVE ELECTRODE OF A BATTERY CELL, POSITIVE ELECTRODE, AND BATTERY CELL

(71) Applicant: Robert Bosch GmbH, Stuttgart (DE)

(72) Inventors: Anika Marusczyk, Stuttgart (DE); Thomas Eckl, Leonberg (DE)

(73) Assignee: Robert Bosch GmbH, Stuttgart (DE)

( * ) Notice: Subject to any disclaimer, the term of this patent is extended or adjusted under 35 U.S.C. 154(b) by 229 days.

(21) Appl. No.: 15/759,877

(22) PCT Filed: Sep. 5, 2016

(86) PCT No.: PCT/EP2016/070809
§ 371 (c)(1),
(2) Date: Mar. 14, 2018

(87) PCT Pub. No.: WO2017/045945
PCT Pub. Date: Mar. 23, 2017

(65) Prior Publication Data
US 2018/0248174 A1    Aug. 30, 2018

(30) Foreign Application Priority Data
Sep. 16, 2015  (DE) .......................... 10 2015 217 747

(51) Int. Cl.
*H01M 4/36* (2006.01)
*H01M 4/13* (2010.01)
(Continued)

(52) U.S. Cl.
CPC .......... *H01M 4/364* (2013.01); *H01M 4/131* (2013.01); *H01M 4/366* (2013.01); *H01M 4/505* (2013.01);
(Continued)

(58) Field of Classification Search
None
See application file for complete search history.

(56) References Cited

U.S. PATENT DOCUMENTS 6,093,505 A      7/2000  Miura
2005/0281727 A1* 12/2005  Yoshizawa .......... C01B 21/0821
                                                     423/385
(Continued)

FOREIGN PATENT DOCUMENTS

CN      102694164 A      9/2012
DE   102012208321 A1   11/2013
(Continued)

OTHER PUBLICATIONS

Kong, et al.: "Ab initio study of doping effects on LiMnO2 and LiMnO3 cathode materials for Li-ion batteries", J. of Mater. Chem. A, 3 (2015), pp. 8489-8500.
International Search Report dated Nov. 18, 2016, of the corresponding International Application PCT/EP2016/070809 filed Sep. 5, 2016.

*Primary Examiner* — Barbara L Gilliam
*Assistant Examiner* — Angela J Martin
(74) *Attorney, Agent, or Firm* — Norton Rose Fulbright US LLP; Gerard A. Messina

(57) ABSTRACT

A positive active material for a positive electrode of a battery cell which includes a first component containing $Li_2MnO_3$. The first component includes a doping with nitrogen ions $N^{2-}$ which replace a portion of the oxygen ions $O^{2-}$ of component. A positive electrode of a battery cell which includes a positive material, and a battery cell which includes at least one positive electrode, are also described.

10 Claims, 2 Drawing Sheets

(51) Int. Cl.
  *H01M 4/50* (2010.01)
  *H01M 4/52* (2010.01)
  *H01M 4/62* (2006.01)
  *H01M 10/05* (2010.01)
  *H01M 4/131* (2010.01)
  *H01M 4/505* (2010.01)
  *H01M 4/525* (2010.01)
  *H01M 10/0525* (2010.01)
  *H01M 4/02* (2006.01)

(52) U.S. Cl.
  CPC ........... *H01M 4/525* (2013.01); *H01M 4/625* (2013.01); *H01M 4/628* (2013.01); *H01M 10/0525* (2013.01); *H01M 2004/028* (2013.01); *Y02T 10/7011* (2013.01)

(56) References Cited

U.S. PATENT DOCUMENTS

2007/0065723 A1   3/2007   Takeda et al.
2010/0035152 A1   2/2010   Sastry et al.
2010/0297504 A1*  11/2010  Oki .................. H01M 4/58
                                              429/231.95
2014/0099559 A1   4/2014   Parans Paranthaman et al.

FOREIGN PATENT DOCUMENTS

| DE | 102012214119 A1 | 2/2014 |
| EP | 2728660 A1 | 5/2014 |
| JP | 2006032321 A | 2/2006 |
| JP | 2012505520 A | 3/2012 |
| WO | 2013120724 A1 | 8/2013 |
| WO | 2013150937 A1 | 10/2013 |

* cited by examiner

ACTIVE MATERIAL FOR A POSITIVE ELECTRODE OF A BATTERY CELL, POSITIVE ELECTRODE, AND BATTERY CELL

The present invention relates to an active material (A) for a positive electrode of a battery cell which includes a first component (A1), containing $Li_2MnO_3$, that is doped with nitrogen ions. Moreover, the present invention relates to a positive electrode of a battery cell which includes an active material (A) according to the present invention, and a battery cell which includes at least one positive electrode according to the present invention.

BACKGROUND INFORMATION

The storage of electrical energy has become increasingly important in recent decades. Electrical energy may be stored with the aid of batteries. Batteries convert chemical reaction energy into electrical energy. A distinction is made between primary batteries and secondary batteries. Primary batteries are non-rechargeable, while secondary batteries, also referred to as accumulators, are rechargeable. A battery includes one or multiple battery cells.

In particular so-called lithium-ion battery cells are used in an accumulator. They are characterized, among other features, by high energy densities, thermal stability, and extremely low self-discharge.

Lithium-ion battery cells include a positive electrode and a negative electrode. The positive and negative electrodes each include a current collector, to which a positive or negative active material is applied.

The positive and negative active material is capable of reversible intercalation and deintercalation of lithium ions.

The active material for the negative electrode is, for example, amorphous silicon which may form intercalation compounds with lithium atoms. However, carbon compounds such as graphite are also widely used as active material for negative electrodes. Lithium atoms are intercalated into the active material of the negative electrode.

A lithium-containing metal oxide or a lithium-containing metal phosphate is generally used as active material for the positive electrode. In particular in applications in which a high energy density is necessary, so-called high-energy materials such as high-energy (HE) nickel-cobalt-manganese (NCM) electrodes (for example, $LiMO_2:Li_2MnO_3$, where M=Ni, Co, Mn) are used. A generic battery that uses such an HE-NCM electrode is described in German Patent Application No. DE 10 2012 208 321 A1, for example.

During operation of the battery cell, i.e., during a discharging operation, electrons flow in an external circuit from the negative electrode to the positive electrode. During a discharging operation, lithium ions migrate from the negative electrode to the positive electrode within the battery cell. In the process, the lithium ions are reversibly deintercalated from the active material of the negative electrode, also referred to as delithiation. During a charging operation of the battery cell, the lithium ions migrate from the positive electrode to the negative electrode. In the process, the lithium ions are reversibly reintercalated into the active material of the negative electrode, also referred to as lithiation.

The electrodes of the battery cell have a foil-like design and are wound to form an electrode winding, with a separator situated in between which separates the negative electrode from the positive electrode. Such an electrode winding is also referred to as a "jelly roll." The electrodes may also be layered one above the other to form an electrode stack.

The two electrodes of the electrode winding or of the electrode stack are electrically connected with the aid of collectors to poles of the battery cell, also referred to as terminals. A battery cell generally includes one or multiple electrode windings or electrode stacks. The electrodes and the separator are surrounded by an electrolyte composition which is generally liquid. The electrolyte composition is conductive for the lithium ions, and allows transport of the lithium ions between the electrodes.

European Patent No. EP 2 728 660 A relates to positive active materials for high-energy lithium-ion batteries based on HE-NCM materials.

U.S. Patent App. Pub. No. 2014/0099559 A1 describes an electrode for a battery, which includes an active material selected from $LiCoO_2$, $LiMn_2O_4$, $Li_2MnO_3$, $LiNiO_2$, $LiMn_{1.5}Ni_{0.5}O_4$, $LiFePO_4$, $Li_2FePO_4F$, $Li_3CoNiMnO_6$, $Li(Li_aNi_xMn_yCo_z)O_2$, and mixtures thereof. The material may also be doped with additional metals. Furthermore, a coating of the electrode with a nitrogen-containing carbon composition is provided.

However, conventional HE-NCM electrodes are characterized in that they deliver high cell voltages at the beginning of the service life of the cell, but over the service life are subject to significant losses (so-called "voltage fade"). The same applies for the capacity of the cell (so-called "capacity fade"). The object of the present invention, therefore, is to provide an active material for a positive electrode, which has a high cell voltage and capacity even after a long service time of the cell.

SUMMARY

An active material (A) for a positive electrode of a battery cell, in particular for a lithium-ion battery cell, is provided which includes a first component (A1) containing a metal oxide of formula (I):

$$Li_2MnO_3 \qquad (I)$$

According to the present invention, first component (A1) of active material (A) includes a doping with nitrogen ions $N^{2-}$.

Due to the doping, preferably a proportion between 0.1 mol % and 15 mol % of the oxygen ions $O^{2-}$ of the metal oxide $Li_2MnO_3$ of the first component of active material (A) of the positive electrode is replaced by the nitrogen ions $N^{2-}$. In particular, a proportion [between] 1 mol % and 10 mol % of the oxygen ions $O^{2-}$ of the $Li_2MnO_3$ is replaced by nitrogen ions $N^{2-}$.

Component (A1) according to the present invention thus includes at least one compound that may be represented by the following formula (II):

$$Li_2MnO_{3-y}N_y \qquad (II)$$

where $3>y>0$. It is preferred that $1.5 \geq y > 0$, in particular $0.5 \geq y > 0$.

According to one advantageous embodiment of the present invention, component (A1) is additionally doped with sodium ions, a portion of the lithium ions of component (A1) being replaced by sodium ions. The rate capability of active material (A) is thus positively influenced. The advantageous embodiment therefore includes a component (A1) of general formula (III):

$$Li_{2-z}Na_zMnO_{3-y}N_y \qquad (III)$$

where y has the meaning described above, and 2≥z≥0. It is preferred that 1≥z≥0.1.

Active material (A) preferably includes a second component (A2) that contains $LiMO_2$. M is a transition metal preferably selected from the elements nickel, cobalt, and manganese. Active material (A), which includes components (A1) and (A2), allows a relatively large capacity of the battery cell combined with a relatively high voltage.

A material according to formula (III) generally results from the doping of first component (A1), containing the metal oxide $Li_2MnO_3$, of active material (A) of the positive electrode with the nitrogen ions $N^{2-}$.

Initially inactive first component (A1) of active material (A) of the positive electrode, which contains the metal oxide $Li_2MnO_3$, is activated during formation of the battery cell, with irreversible cleavage of oxygen. The formation of the battery cell takes place in that a defined voltage is applied to the battery cell for the first time, and a defined current flows through the battery cell for the first time. Such a process for forming a battery cell, in which formation currents are applied to the battery cell to activate electrochemical processes, is described in German Patent Application No. DE 10 2012 214 119 A1, for example.

The doping of first component (A1), which contains the metal oxide $Li_2MnO_3$, takes place prior to the formation and activation of the battery cell.

During the doping, portions of the oxygen ions $O^{2-}$ of the metal oxide $Li_2MnO_3$ are replaced by the nitrogen ions $N^{2-}$. The nitrogen ions are capable of assuming the oxidation state −2 ($N^{2-}$) as well as the oxidation state −1 ($N^-$), and with sufficient voltage level are redox-active. The nitrogen ions may thus take part in the charge compensation during the charging and discharging of the battery cell. The irreversible oxygen loss is reduced due to the provided doping of the positive active material with nitrogen ions. Since such a reduction of the defects in the material is achieved, the destabilization of the material structure is also reduced due to rearrangements and migrations of transition metals in the positive active material. This results in a stabilization of the capacity and voltage level, since the active material is subject to fewer changes.

In addition, the nitrogen ions $N^{2-}$ are sufficiently electronegative to bind electrons to them and not release them to a neighboring manganese. Thus, the generation of electrochemically undesirable $Mn^{3+}$ ions is prevented. In addition, it is assumed that the doping according to the present invention of positive active material (A) with nitrogen anions stabilizes the oxygen, in particular for high states of charge. The total voltage of the cell is thus also stabilized. Another advantage of the nitrogen ions is the relatively low cost and the low weight, which has a positive effect on the specific capacity.

During the doping, portions of the oxygen ions $O^{2-}$ of the metal oxide $Li_2MnO_3$ are replaced by nitrogen ions $N^{2-}$. The properties of the composition are thus preferably not adversely affected. For example, the doping takes place using nitrogen compounds of lithium or manganese. Also possible are nitrogen-oxygen compounds or compounds of nitrogen with other elements, provided that the introduced elements do not adversely affect the properties of the active material and/or are able to be removed from the active material.

The doping generally results in an active material (A) of the positive electrode which includes a first component (A1) containing the nitrogen-doped metal oxide $Li_2MnO_3$, and a second component (A2) containing the NCM compound $LiMO_2$, according to the following formula (IV):

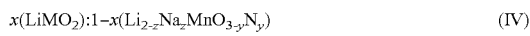

$$x(LiMO_2):1-x(Li_{2-z}Na_zMnO_{3-y}N_y)$$ (IV)

where M, z, and y have the meanings described above, and 1>x≥0. It is preferred that 1>x>0, in particular 0.8≥x≥0.2.

Moreover, a positive electrode of a battery cell is provided which includes an active material (A) according to the present invention.

According to one advantageous refinement of the present invention, a coating containing aluminum fluoride ($AlF_3$) is applied to active material (A) of the positive electrode. A coating containing aluminum fluoride on active material (A) of the positive electrode has a positive effect on the capacity of the battery cell.

In particular, the coating prevents or reduces contact of active material (A) of the positive electrode with an electrolyte composition contained in the battery cell. Elutriation of transition metals from active material (A) of the positive electrode and migration of elutriated transition metals to the negative electrode of the battery cell are likewise prevented or reduced.

According to another advantageous refinement of the present invention, a coating containing carbon is applied to active material (A) of the positive electrode. Such a coating ensures homogeneous electronic contacting of the positive electrode.

The $AlF_3$-containing coating and the carbon-containing coating may also be applied to active material (A) of the positive electrode together, in particular one above the other, i.e., in layers.

Furthermore, a battery cell is provided which includes at least one positive electrode according to the present invention.

A battery cell according to the present invention is advantageously used in an electric vehicle (EV), in a hybrid vehicle (HEV), in a plug-in hybrid vehicle (PHEV), in a tool, or in a consumer electronic product. Tools are understood in particular to mean tools for home use and garden tools. Consumer electronic products are understood in particular to mean mobile telephones, tablet PCs, or notebooks.

Due to the partial replacement of the oxygen ions $O^{2-}$ in the metal oxide of first component (A1) of active material (A) of the positive electrode by nitrogen ions $N^{2-}$, an active material (A) is provided which ensures a stable voltage over a relatively long time period and a large number of cycles when used in a lithium-ion battery cell. Likewise, the capacity of the lithium-ion battery cell remains stable over a relatively long time period and a large number of cycles. Losses in voltage and capacity are significantly reduced. The service life of the battery is thus increased, thus enabling commercial use in particular of lithium-ion batteries with an NCM compound in active material (A) of the positive electrode.

BRIEF DESCRIPTION OF THE DRAWINGS

Specific embodiments of the present invention are explained in greater detail below with reference to the figures.

DETAILED DESCRIPTION OF EXAMPLE EMBODIMENTS

Figure 1:
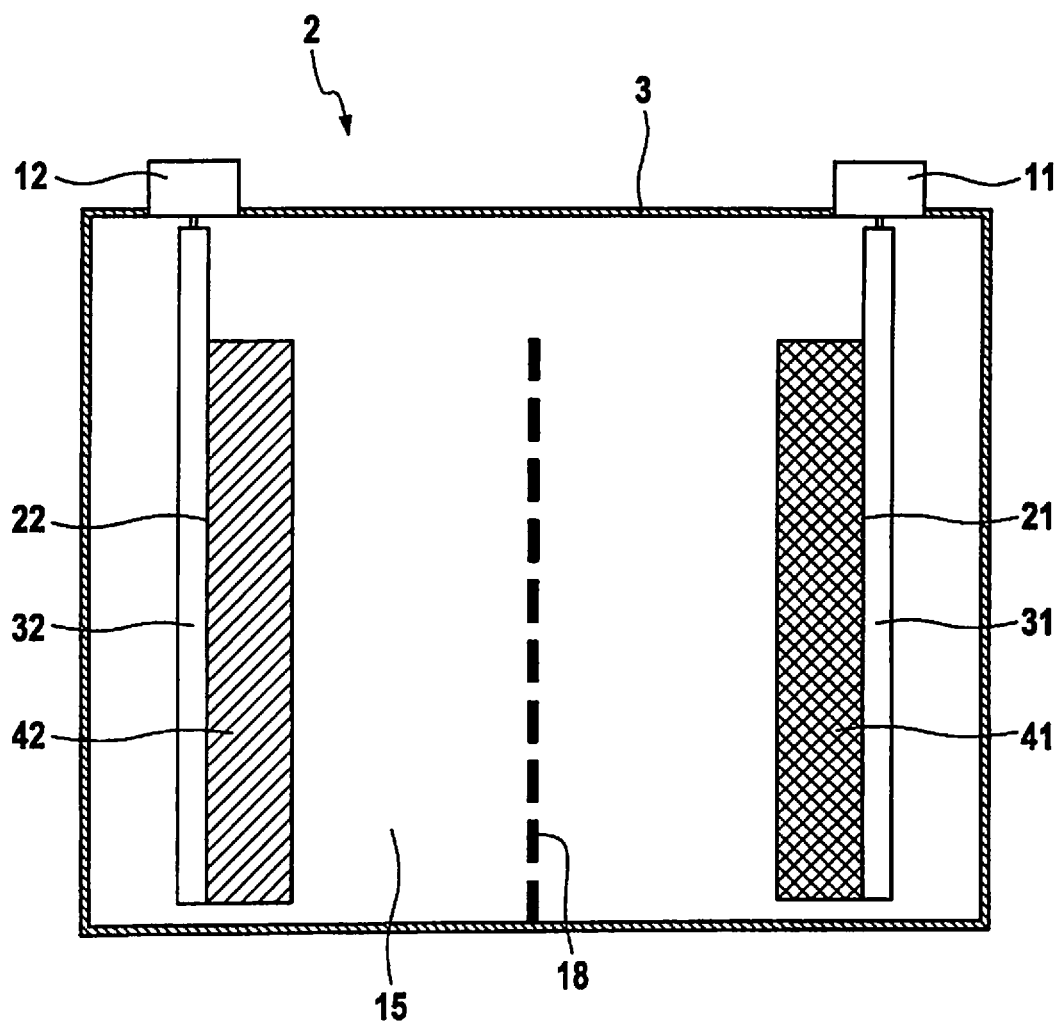
FIG. 1 shows a schematic illustration of a battery cell.

A battery cell 2 is schematically illustrated in FIG. 1. Battery cell 2 includes a cell housing 3 having a prismatic design, in the present case a cuboidal design. In the present case, cell housing 3 has an electrically conductive design and is made of aluminum, for example. However, cell housing 3 may also be made of an electrically insulating material, for example plastic.

Battery cell 2 includes a negative terminal 11 and a positive terminal 12. A voltage provided by battery cell 2 may be tapped via terminals 11, 12. In addition, battery cell 2 may also be charged via terminals 11, 12. Terminals 11, 12 are situated spaced apart from one another on a top surface of prismatic cell housing 3.

An electrode winding which includes two electrodes, namely, a negative electrode 21 and a positive electrode 22, is situated within cell housing 3 of battery cell 2. Negative electrode 21 and positive electrode 22 each have a foil-like design, and are wound to form an electrode winding with a separator 18 situated in between. It is also possible to provide multiple electrode windings in cell housing 3. An electrode stack, for example, may also be provided instead of the electrode winding.

Negative electrode 21 includes a negative active material 41 which has a foil-like design. Negative active material 41 contains silicon or a silicon-containing alloy as the base material.

Negative electrode 21 also includes a current collector 31, which likewise has a foil-like design. Negative active material 41 and current collector 31 are placed flatly against one another and joined together. Current collector 31 of negative electrode 21 has an electrically conductive design and is made of a metal, for example copper. Current collector 31 of negative electrode 21 is electrically connected to negative terminal 11 of battery cell 2.

In the present case, positive electrode 22 is a high-energy (HE) nickel-cobalt-manganese (NCM) electrode. Positive electrode 22 includes a positive active material (A) 42 which is present in particle form. Additives, in particular conductive carbon black and binder, are situated between the particles of positive active material (A) 42. Positive active material (A) 42 and the additives form a composite which has a foil-like design.

Positive active material (A) 42 includes a first component (A1) containing $Li_2MnO_3$. The first component of positive active material (A) 42 also has doping with nitrogen ions $N^{2-}$ that replace at least a portion of the oxygen ions $O^{2-}$ of the component $Li_2MnO_3$. First component (A1) may be additionally doped with sodium ions, so that a portion of the lithium ions is replaced by sodium ions.

Positive active material (A) 42 also includes a second component (A2) containing an NCM compound, namely, $LMO_2$. M is a transition metal selected in particular from nickel, cobalt, and manganese. Further components of positive active material (A) 42 are in particular PVDF binder, graphite, and carbon black.

Positive electrode 22 also includes a current collector 32 which likewise has a foil-like design. The composite, made up of positive active material (A) 42 and the additives, and current collector 32 are placed flat against one another and joined together. Current collector 32 of positive electrode 22 has an electrically conductive design and is made of a metal, for example aluminum. Current collector 32 of positive electrode 22 is electrically connected to positive terminal 12 of battery cell 2.

Negative electrode 21 and positive electrode 22 are separated from one another by separator 18. Separator 18 likewise has a foil-like design. Separator 18 has an electronically insulating design, but is ionically conductive, i.e., is permeable for lithium ions.

Cell housing 3 of battery cell 2 is filled with a liquid aprotic electrolyte composition 15 or with a polymer electrolyte. Electrolyte composition 15 surrounds negative electrode 21, positive electrode 22, and separator 18. Electrolyte composition 15 is also ionically conductive, and includes, for example, a mixture of at least one cyclic carbonate (for example, ethylene carbonate (EC), propylene carbonate (PC), butylene carbonate (BC)) and at least one linear carbonate (for example, dimethylene carbonate (DMC), diethyl carbonate (DEC), methylethyl carbonate (MEC)) as solvent, and a lithium salt ($LiPF_6$, $LiBF_4$, for example) as additive.

Figure 2:
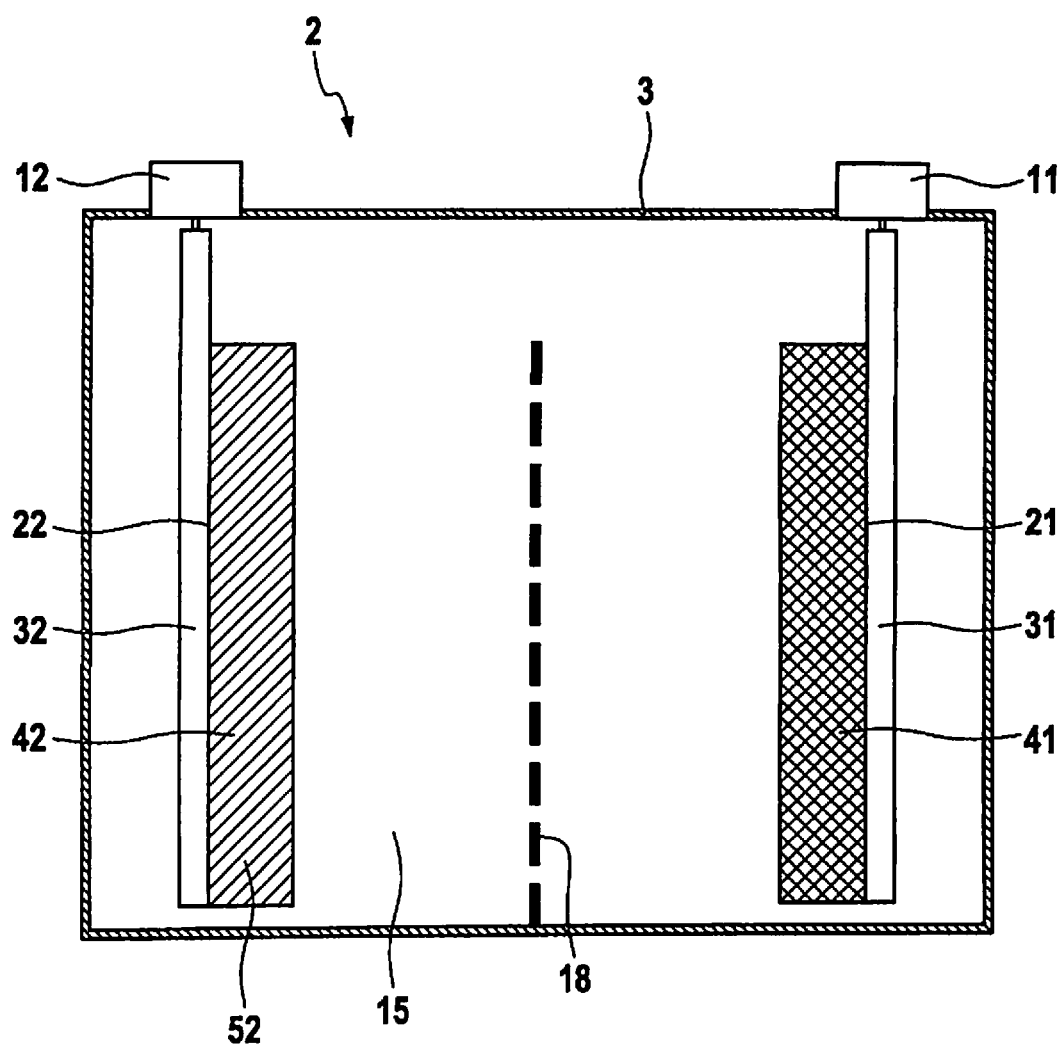
FIG. 2 shows a schematic illustration of a modification of the battery cell from FIG. 1.

FIG. 2 schematically illustrates a modification of battery cell 2 from FIG. 1. Modified battery cell 2 likewise includes a cell housing 3 which has a prismatic design, in the present case a cuboidal design. Battery cell 2 is very similar to battery cell 2 from FIG. 1. Therefore, in particular differences from battery cell 2 from FIG. 1 are discussed below.

A coating 52 is applied to the particles of positive active material (A) 42. The particles of positive active material (A) 42 are enclosed by coating 52. Coating 52 thus envelops the particles of positive active material (A) 42.

In the present case, coating 52 contains aluminum fluoride ($AlF_3$). Coating 52 prevents or reduces contact of positive active material (A) 42 with electrolyte composition 15 contained in cell housing 3 of battery cell 2. Elutriation of transition metals from positive active material (A) 42 and migration of elutriated transition metals to negative electrode 21 of battery cell 2 are likewise prevented or reduced.

Coating 52 may also contain carbon. A coating 52 of this type ensures homogeneous electronic contacting of positive electrode 22. Coating 52 may in particular have a multilayer design, and, for example, may contain a layer of aluminum fluoride ($AlF_3$) and a layer of carbon.

The present invention is not limited to the exemplary embodiments described herein and the aspects highlighted therein. Rather, numerous modifications within the range set forth in the claims are possible which are within the scope of activities carried out by those skilled in the art.

What is claimed is:

1. A positive active material for a positive electrode of a battery cell, comprising:
a first component containing a compound having a general formula:

$$Li_{2-z}Na_zMnO_{3-y}N_y;$$

where $3 > y > 0$; and
$2 \geq z \geq 0$, so that z is greater than zero for Na (Sodium).

2. The positive active material as recited in claim 1, wherein $1.5 \geq y > 0$.

3. The positive active material as recited in claim 1, wherein $0.5 \geq y > 0$.

4. The positive active material as recited in claim 1, wherein $1 \geq z \geq 0.1$.

5. The positive active material as recited in claim 1, wherein the positive active material further includes a second component containing $LiMO_2$, M being a transition metal selected the elements nickel, cobalt, and/or manganese.

6. The positive active material as recited in claim 4, wherein the positive active material includes a compound having a formula:

$$x(LiMO_2):1-x(Li_{2-z}Na_zMnO_{3-y}N_y);$$

where $1 > x \geq 0$;
$3 > y > 0$; and
$2 \geq z \geq 0$, so that z is greater than zero for Na (Sodium).

7. A positive electrode of a battery cell, comprising:
a positive active material, the positive active material including:
a first component containing a compound having a general formula:

$Li_{2-z}Na_zMnO_{3-y}N_y$;

where $3>y>0$; and
$2 \geq z>0$, so that z is greater than zero for Na (Sodium).

8. The positive electrode as recited in claim 7, further comprising:
a coating containing aluminum fluoride ($AlF_3$) applied to the positive active material.

9. The positive electrode as recited in claim 7, further comprising:
a coating containing carbon applied to the positive active material.

10. A battery cell which includes at least one positive electrode, the positive electrode including a positive active material, the positive active material comprising:
a first component containing a compound having a general formula:

$Li_{2-z}Na_zMnO_{3-y}N_y$;

where $3>y>0$; and
$2 \geq z>0$, so that z is greater than zero for Na (Sodium).

* * * * *